(12) United States Patent
Werz et al.

(10) Patent No.: US 7,997,585 B2
(45) Date of Patent: Aug. 16, 2011

(54) CYLINDER HEAD GASKET

(75) Inventors: Ulrich Werz, Dettingen (DE); Armin Diez, Lenningen (DE)

(73) Assignee: ElringKlinger AG, Dettingen (DE)

( * ) Notice: Subject to any disclaimer, the term of this patent is extended or adjusted under 35 U.S.C. 154(b) by 1722 days.

(21) Appl. No.: 10/116,317

(22) Filed: Apr. 3, 2002

(65) Prior Publication Data
US 2002/0180161 A1 Dec. 5, 2002

(30) Foreign Application Priority Data

Apr. 5, 2001 (DE) .................................. 101 17 178

(51) Int. Cl.
*F02F 11/00* (2006.01)
(52) U.S. Cl. ..................................................... 277/593
(58) Field of Classification Search ........... 277/592–596
See application file for complete search history.

(56) References Cited

U.S. PATENT DOCUMENTS

| 4,721,315 | A | * | 1/1988 | Ueta ............................... 277/593 |
| 5,609,345 | A | * | 3/1997 | Miura et al. ..................... 277/593 |
| 5,618,049 | A | * | 4/1997 | Ueta ............................... 277/595 |
| 5,873,577 | A | * | 2/1999 | Inamura ......................... 277/594 |
| 5,876,038 | A | | 3/1999 | Bohm et al. |
| 5,957,463 | A | * | 9/1999 | Inamura ......................... 277/593 |
| 6,957,815 | B1 | * | 10/2005 | Inciong .......................... 277/593 |
| 2002/0020970 | A1 | | 2/2002 | Miyaoh et al. |
| 2003/0080514 | A1 | * | 5/2003 | Barclay et al. ................ 277/598 |

FOREIGN PATENT DOCUMENTS
DE 42 22 338 A1 1/1994
DE 195 13 360 C1 3/1999
DE 19844570 C1 * 4/2000
EP 0 230 804 B1 8/1980
(Continued)

OTHER PUBLICATIONS

European Search Report.

*Primary Examiner* — Vishal Patel
(74) *Attorney, Agent, or Firm* — Alix, Yale & Ristas, LLP

(57) ABSTRACT

The invention relates to a metallic cylinder head gasket for an internal combustion engine having a cylinder block with adjacent combustion chambers and a cylinder head connected to the said block by bolts, having at least one sheet metal layer of resilient metal, which is provided with a plurality of combustion chamber openings corresponding to the combustion chambers of the internal combustion engine, and also fluid and bolt passage openings, where, around each combustion chamber opening, at a distance from the latter, leaving a straight sheet metal section in the opening edge area, a bead is provided, whose spring travel is limited by a stopper extending concentrically with respect to the bead the stopper being profiled in terms of height and/or width in accordance with reductions in compression pressure to be expected in specific areas on account of reduced component stiffness of cylinder block and cylinder head in the clamped state of the cylinder head gasket, where, when profiling the stopper height and/or width, the increase in the compression pressure as a result of thermal expansions to be expected because of the operating temperature of the internal combustion engine is additionally taken into account in such a way that the profiling is designed substantially in accordance with a mid-range between an increase in compression pressure resulting from thermal expansions and a decrease in compression pressure resulting from component stiffnesses.

17 Claims, 5 Drawing Sheets

FOREIGN PATENT DOCUMENTS

| | | |
|---|---|---|
| EP | 0 306 766 B1 | 4/1992 |
| EP | 0 950 842 A2 | 10/1992 |
| EP | 0 740 092 A1 | 10/1996 |
| EP | 0 797 029 A1 | 9/1997 |
| EP | 1 179 695 A2 | 2/2002 |
| EP | 0 950 842 B1 | 7/2003 |
| JP | 11002324 A * | 1/1999 |

* cited by examiner

CYLINDER HEAD GASKET

FIELD OF THE INVENTION

The invention relates to a metallic cylinder head gasket as it us used in an internal combustion engine between a cylinder block and a cylinder head to seal a gap therebetween.

BACKGROUND OF THE INVENTION

European patent EP 0 306 766 B1 or EP 0 230 804 B1 discloses a metallic cylinder head gasket for an internal combustion engine in which a carrier plate is provided together with at least one beaded, resilient covering plate as a functional plate. Since the sealing gap between cylinder head and cylinder block of an internal combustion engine changes during operation as a function of the operating cycle of the cylinder respectively considered, the gasket is continually subjected to compression changes and, in order to maintain a satisfactory seal, must have permanent spring properties. For this purpose, the bead running around the respective combustion chamber opening and acting as a spring element is protected by a spring stroke limiter or stopper which is arranged along the edge of the combustion chamber and limits the spring stroke of the bead, which follows the relative movements of the cylinder head with respect to the cylinder block which take place vertically with respect to the plane of the gasket, so that the bead moves only in the spring stroke range provided for it and cannot be pressed flat. For this purpose, the relief of the loading on the bead must not be complete but must take place only to such an extent that minimum deformation ensures the necessary sealing at the maximum combustion chamber pressure that occurs. The spring stroke limiter forms an elevation of the cylinder head gasket that extends along the combustion chamber edge.

For internal combustion engines with cylinder liners, however, gaskets of this type are unsuitable, since vertical forces which occur as the gasket is being clamped in or when it is clamped in are introduced to the combustion chamber edge and therefore substantially into the cylinder liner, so that tilting moments occur.

European patent application EP 0 740 092 A1 therefore discloses a metallic cylinder head gasket for an internal combustion engine which has cylinder liners. This gasket comprises at least one beaded top plate and a carrier plate and is provided with a deformation limiter which is provided for the respective bead and forms an elevation for the gasket, is formed by a ring on the carrier plate and is applied to that side of the bead which faces away from the combustion chamber opening, so that it is supported on the liner collar.

German patent DE 195 13 360 C1 discloses a metallic cylinder head gasket for an internal combustion engine in which at least one beaded top plate and a carrier plate are provided, a deformation limiter for the respective bead being provided around each opening, along the combustion chamber edge. In this case, the deformation limiter is profiled in terms of height and/or width in the circumferential direction in accordance with the component stiffness of cylinder head and block, in order to achieve the most uniform pressing force distribution possible. Furthermore, in this case, in addition to the inner deformation limiter, an outer deformation limiter can also be provided on the side of the respective bead which faces away from the combustion chamber opening, in order in this way to achieve the introduction of force into the bead area which takes place as vertically as possible in relation to the plane of the gasket.

Above all in internal combustion engines with cylinder liners, it has transpired that, even when use is made of an outer deformation limiter that is profiled in terms of height and/or width, problems repeatedly occur with regard to the tightness of the cylinder head gasket. This problem could not even be solved by use being made additionally of a corresponding inner deformation limiter.

SUMMARY OF THE INVENTION

It is therefore an object of the invention to provide a cylinder head gasket which at least reduces the above problems of the known gaskets and exhibits improved sealing behaviour.

The invention provides a metallic cylinder head gasket for an internal combustion engine having a cylinder block with adjacent combustion chambers and a cylinder head connected to the said block by bolts, having at least one sheet metal layer of resilient metal, which is provided with one or more combustion chamber openings corresponding to the combustion chambers of the internal combustion engine, and also fluid and bolt passage openings, where, around each combustion chamber opening, at a distance from the latter, leaving a plane sheet metal section in the opening edge area, a bead is provided, whose spring stroke is limited by a stopper extending concentrically with respect to the bead, wherein a layer of the gasket forming one of the stopper and a part engaging the stopper during use is provided with a height profile in accordance with reductions in compression pressure to be expected in specific areas on account of reduced component stiffness of cylinder block and cylinder head in the clamped state of the cylinder head gasket; and wherein the increase in the compression pressure as a result of thermal expansions to be expected because of the operating temperature of the internal combustion engine is additionally taken into account by providing the height profile with an additional height of about 10 to 60 μm so that the profiling is designed substantially in accordance with a mid-range between an increase in compression pressure resulting from thermal expansions and a decrease in compression pressure resulting from component stiffnesses.

The invention further provides a metallic cylinder head gasket for an internal combustion engine having a cylinder block with adjacent combustion chambers having cylinder liners and a cylinder head connected to the said block by bolts, having at least one top plate made of resilient metal and a carrier plate, which are provided with one or more combustion chamber openings corresponding to the combustion chambers of the internal combustion engine, and also fluid and bolt passage openings, where, around each combustion chamber opening, at a distance from the latter, leaving a straight sheet metal section in the opening edge area, the at least one top plate has a bead whose spring travel is limited by an outer stopper extending concentrically with respect to the bead on its outer side with respect to the combustion chamber opening and carried by the carrier plate, the outer stopper being profiled in terms of at least one of the stopper dimensions height and width in accordance with reductions in compression pressure to be expected in specific areas on account of reduced component stiffness of cylinder block and cylinder head in the clamped state of the cylinder head gasket;

wherein the beads are arranged at a distance from the combustion chamber edge, so that they are supported on the cylinder block adjacent to the cylinder liners;

wherein, on the inner side of the respective bead, a stopper is provided which is carried by the carrier plate;

wherein one of the stopper and the carrier plate is provided with a height profile with respect to the component stiffness; and wherein the the increase in the compression pressure as a result of thermal expansions to be expected because of the operating temperature of the internal combustion engine is additionally taken into account by providing the height profile with an additional height of about 10 to 60 μm so that the profiling is designed substantially in accordance with a mid-range between an increase in compression pressure resulting from thermal expansions and a decrease in compression pressure resulting from Component stiffnesses.

The fact that a deformation limiter is used, where, when profiling the height and/or width of the deformation limiter, the increase in the compression pressure as a result of thermal expansions to be expected because of the temperatures that occur during operation, for example at about 60 to 100% of the full load of the internal combustion engine, in particular at maximum load, is additionally taken into account in such a way that the profiling is designed substantially in accordance with a mid-range between an increase in compression pressure resulting from thermal expansions and a decrease in compression pressure resulting from component stiffnesses, means that the tightness of the cylinder head gasket can be increased. This applies in particular in the case of internal combustion engines with narrow webs between the combustion chambers, since it is obvious that the dissipation of heat from these webs is poorer than from other areas of the cylinder block, so that there the thermal expansions manifest themselves to a greater extent and lead to impermissible increases in pressure, since hitherto, in the area of the webs, a lower component stiffness or an increased component yield was assumed and therefore the deformation limiter was designed to be higher than in other areas, so that impermissible compression pressures were then achieved, which led to permanent deformations of the engine components and therefore to leaks and ultimately even to increased bead cracks. In this connection, it should be noted that the operating range of the beads is therefore based on the internal combustion engine at operating temperature.

Further objects, embodiments and advantages of the invention can be taken from the following description and the claims.

BRIEF DESCRIPTION OF THE DRAWINGS

The invention will be explained in more detail below using exemplary embodiments presented in the appended figures, in which.

DETAILED DESCRIPTION OF PREFERRED EMBODIMENTS

Figure 1:
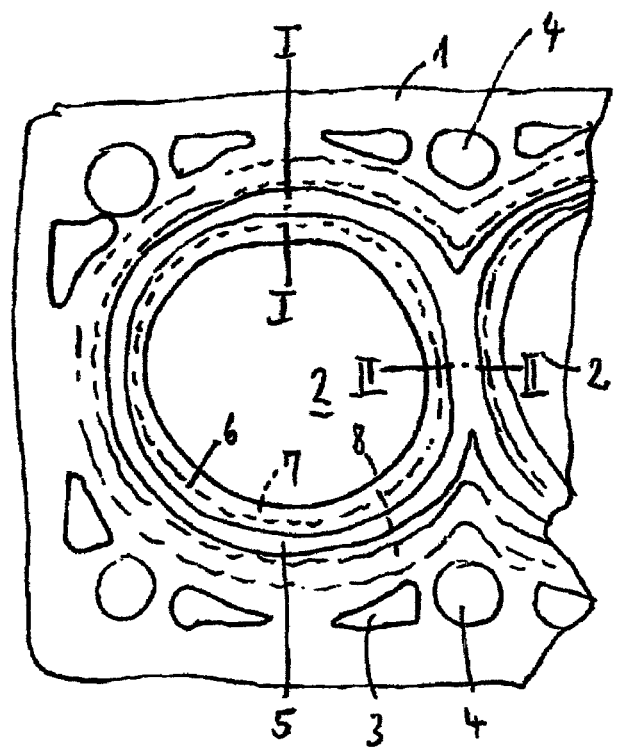
FIG. 1 shows a detail of a cylinder head gasket in plan view.

The cylinder head gasket shown as a detail in plan view in FIG. 1 comprises a resilient top plate 1, normally produced from spring steel, which is provided with a row of combustion chamber openings 2 arranged adjacently beside one another and each separated by a narrow web, corresponding to the combustion chambers of an internal combustion engine, and also with fluid passage openings 3, for example for cooling water or oil, and bolt passage openings 4 for bolts, which are used to bias the cylinder block and cylinder head of the internal combustion engine. The top plate 1 is provided with beads 5, which are arranged at intervals whilst leaving a straight plate section 6 in the edge area of the combustion chamber opening 2. The beads 5 are protuding to one side of the plate 1 and hollow on the other side of the plate 1 i.e. the thickness of the plate 1 in the areas of the beads 5 is not substantially-reduced. Seals such as half beads or caterpillars made of resilient material (not illustrated here) are likewise provided around the remaining openings 3, 4.

For the respective bead 5, an inner deformation limiter or stopper 7 is provided along the combustion-chamber opening 2. Instead of this or together with this, an outer deformation limiter or stopper 8 is also provided, which, with respect to the bead 5, is located on the side of the bead 5 facing away from the combustion chamber opening 2. Both stoppers 7, 8 are located on the side of the top plate 1 to which the bead 5 is curved, in order to be able to limit the spring stroke of the latter.

Figure 2:
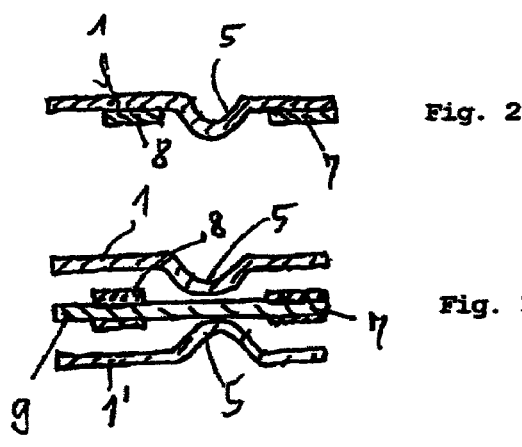
FIGS. 2 to 4 show sections corresponding to the line I-I from FIG. 1 for different embodiments of the cylinder head gasket.
Figure 3:
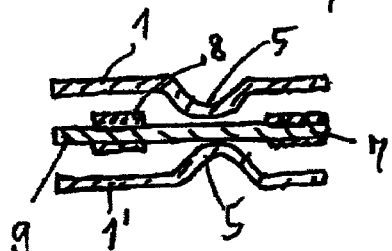
Figure 4:
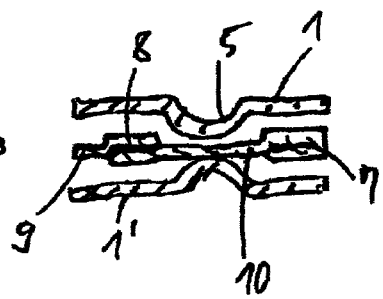

The stopper(s) 7, 8 can be arranged on the top plate 1 or on a separate carrier or folded plate 9 and 10, cf. FIGS. 2 to 4, it being possible for a second, resilient, beaded top plate 1' to be provided as well and then, preferably, the deformation limiter 7 or 8 being centred with respect to the two top plates 1, 1' arranged with mirror symmetry in relation to each other. If the stopper 7 or 8 consists of metal, it may be welded on. However, it may also consist of a highly filled plastic and, for example, be applied by screen printing. It can also be applied by other processes, such as plasma spraying, or, moreover, can be integrally moulded, cf. FIG. 10.

Figures 5, 6, 7:
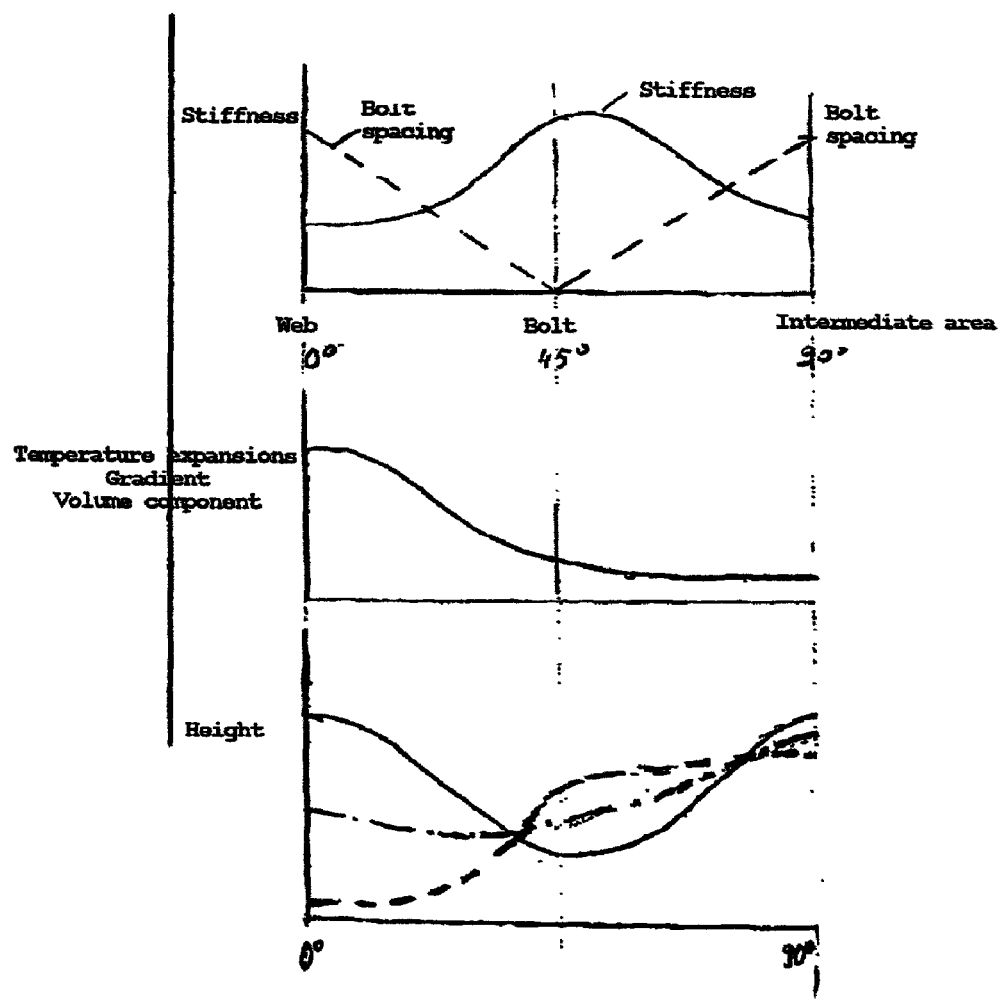
FIG. 5 shows a graph relating to the stiffness and pressing force as a function of the bolt spacing over a subarea of a deformation limiter.
FIG. 6 shows a graph relating to the temperature expansion of the components of an, internal combustion engine over the area considered in FIG. 5.
FIG. 7 shows a graph relating to optimization of the height profiling V of a deformation limiter.

As FIG. 5 reveals, under the assumption that the stopper 7 or 8 has a constant height, the result is a decrease in pressing force (shown dashed) which is continuous in accordance with the bolt spacing, is produced by uniformly tightened bolts and exerted on the cylinder head gasket clamped in this way, from one bolt to the other as far as the central area between two adjacent bolts, which here are arranged at the corners of a square. FIG. 5 therefore considers the area from the centre of the web (0°) between two combustion chamber openings 2 as far as the line I-I (90°). The component stiffness (shown drawn continuously) is in contrast highest in the area of the bolt passage opening 4 and falls away towards the bolt intermediate area.

Not taken into account here are additional changes in the component stiffness on account of appropriate ducts or openings in the components corresponding to the fluid passage openings 3, and also on account of areas of lower wall thickness, for example in the cylinder head. These can change or partially displace the two curves shown in FIG. 5.

FIG. 6 shows the temperature expansion for the area shown in FIG. 5. As can be seen, this expansion is highest in the area of the web between combustion chamber openings 2, particularly since the latter is thin and the dissipation of heat from this area is relatively poor as compared with other areas. In addition, this curve is influenced appropriately by relatively cold areas, for example adjacent to cooling water ducts. This is not taken into account here.

FIG. 7 shows height profiling of the stopper 7 or 8 for the same area as considered in FIGS. 5 and 6, firstly in order to compensate for the component stiffness changes (continuous line) and secondly to compensate for temperature expansions (dashed line). In order to take both effects into account, the actual height profiling of the stopper 7 or 8 is designed substantially in accordance with a mid-range between an increase in compression pressure resulting from thermal expansions and a decrease in compression pressure resulting from component stiffnesses (dash-dotted line).

In this way, it is possible to reduce or even to prevent permanent deformations on the engine components. Fewer bead cracks occur.

Figure 8:
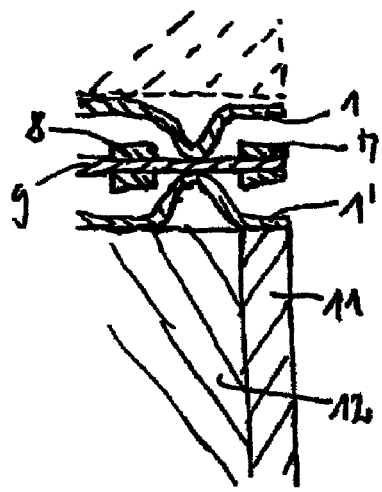
FIGS. 8 and 9 show two sections corresponding to the lines I-I and II-II from FIG. 1 of a further embodiment of a cylinder head gasket.
Figure 9:
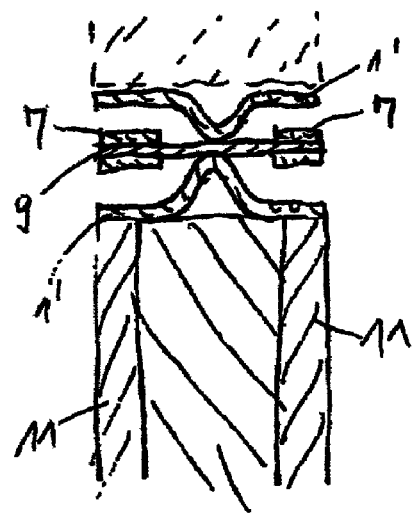

In the case of the cylinder head gasket illustrated in FIGS. 8, 9 in section corresponding to the lines I-I and II-II from FIG. 1, the said gasket is one for an internal combustion engine with cylinder liners 11, which are inserted into corresponding holes in a cylinder block 12 and form the combustion chambers. In this case, this may be, for example, a cylinder block 12 made of an aluminium alloy and cylinder liners 11 made of grey cast iron. In the web area between two adjacent combustion chambers, the beads 5 run together to form a common bead in the exemplary embodiment shown. The outer deformation limiters 8 surround the beads 5 like a pair of spectacles.

In this case, "radial" height profiling can advantageously also be provided, in that, depending on the component stiffness and temperature expansion, the inner deformation limiter 7 can be designed to be higher or lower or as high as (considered radially with respect to the combustion chamber axis or in the longitudinal direction of the internal combustion engine) the outer deformation limiter 8.

Figure 10:
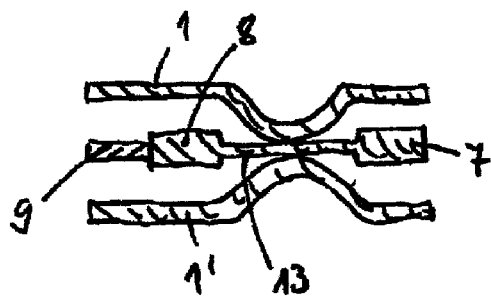
FIG. 10 shows a section corresponding to the line I-I of an additional embodiment of a cylinder head gasket.

In the embodiment shown in FIG. 10, the inner and outer-stoppers 7, 8 are formed on an inserted ring 13 by upset edges of the latter, the edges being simultaneously appropriately profiled in terms of height and/or width during upsetting. As a result of the upsetting, the durability of the stopper 7 or 8 is increased, and the edge pressure is kept low, slight radially outward convexity or bevelling of the stopper 7 or 8 additionally assisting this.

Figure 11:
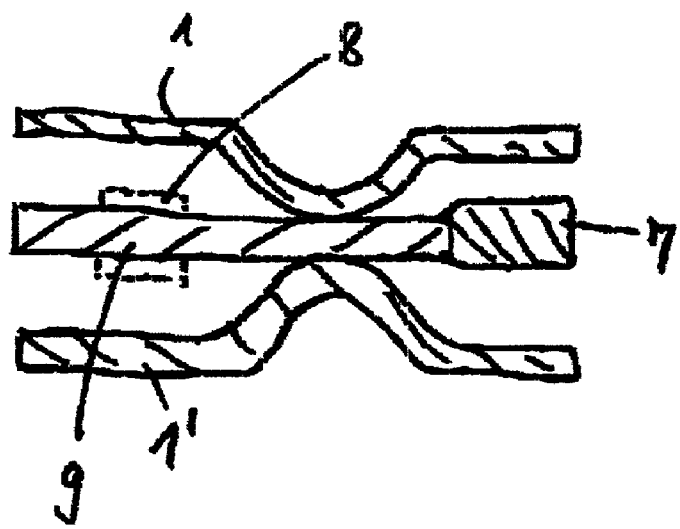
FIG. 11 shows a section corresponding to the line I-I of an embodiment modified with respect to FIG. 10.

In the embodiment shown in FIG. 11, the stopper 7 is designed as a separate ring, which is inserted into a corresponding opening in the carrier plate 9 and is connected to the latter, for example by welding.

Figure 12:
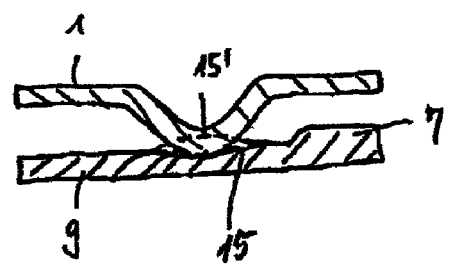
FIG. 12 shows a section along the line I-I from FIG. 1 of an additional embodiment.

In addition, as FIG. 12 reveals, depressions 15 (for example embossing) extending in the circumferential direction and/or elevations (for example applications) 15' can be provided in the area on the carrier plate 9 in which the bead 5 stands up, changing the profile of the carrier plate 9 accordingly in the area in which the bead 5 stands up, these profile changes of the carrier plate 9 serving to adapt the reference points of the bead operating range to predefined design points, if appropriate while taking account of the temperature expansions that occur in operation.

Figure 13:
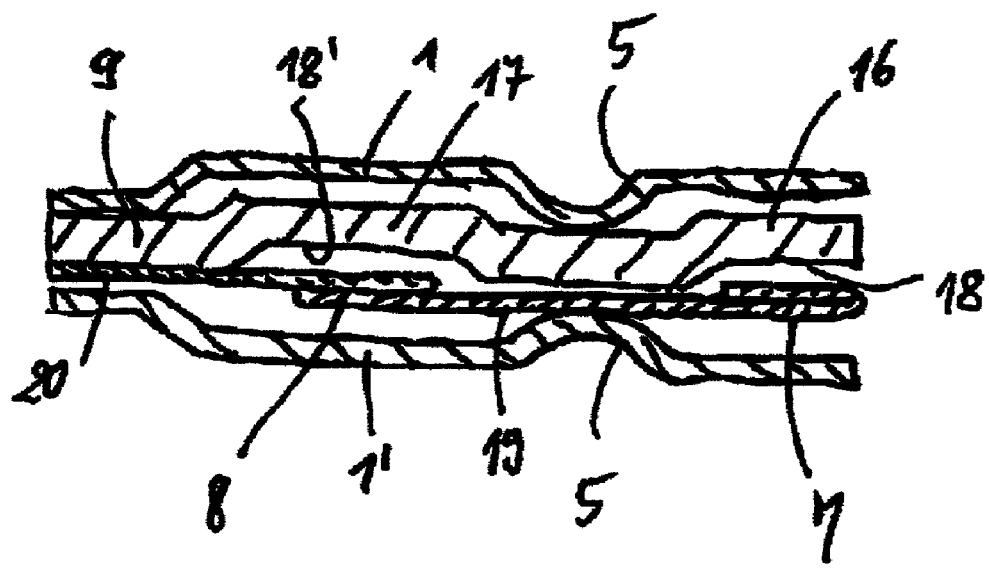
FIG. 13 shows a section along the line I-I from FIG. 1 of a further embodiment.

In the embodiment shown in FIG. 13, the carrier plate 9 is provided with an angled section 16 on the combustion chamber side and with an approximately trapezoidal bead 17 on the side of the bead 5 facing away from the combustion chamber. The section 16 and the bead 17 each form an area 18, 18' which is concentric with the bead 5, is appropriately provided with height profiling substantially in accordance with a mid-range between an increase in compression pressure resulting from thermal expansion and a decrease in compression pressure resulting from component stiffnesses, and in each case interacts with a stopper 7 or 8 of constant height. This means that the height and, possibly, width profiling is provided here on the carrier plate 9 for example by means of appropriate embossing, so that, overall, the area thickened by the stopper 7 or 8 between the top plates 1, 1' exhibits the appropriate profiling. In this case, the inner stopper 7 is formed by the edge of a folded plate ring 19 folded over at the combustion chamber edge, while the outer stopper 8 is formed by the overlap between the folded plate ring 19 and a secondary plate 20.

Figure 14:
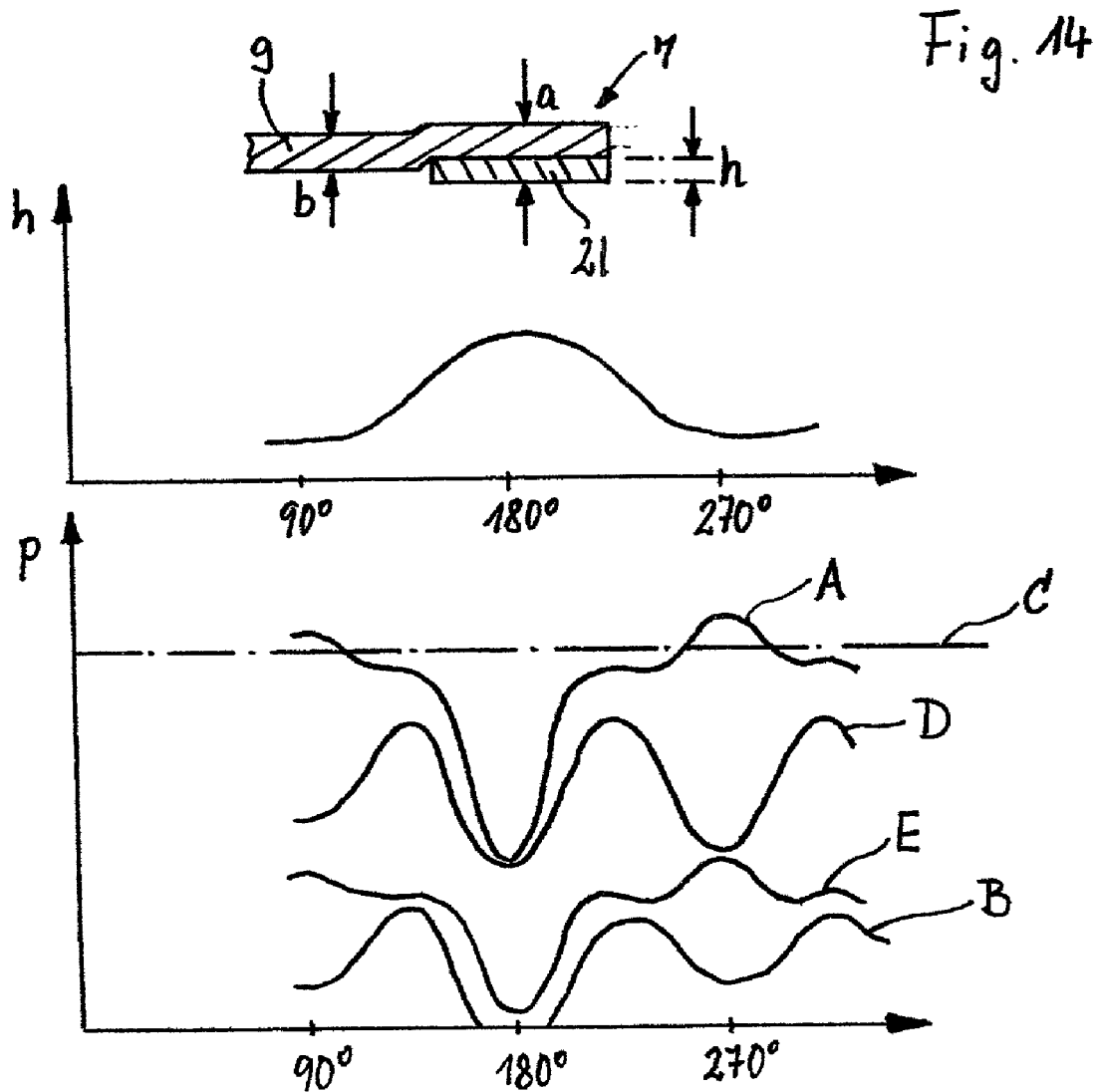
FIG. 14 shows a schematic diagram visualizing the dependency between stopper height and exerted pressure partly around combustion chamber opening.

FIG. 14 shows schematically in a diagram the dependency of the stopper height protrusion h=thickness of the stopper a−thickness of the carrier plate b on the location along a combustion chamber opening (this is visualized in FIG. 14 by a carrier plate 9 and a ring 21 of height h connected therewith by welding). Shown is the area of the web between two combustion chamber openings (being present at angles of 90° and 270°), the adjacent areas of the screws (being present at angles of 45°, 135°, 225° and 315°) and of the exhaust gas outlet (at an angle of 180°) which is the most critical area because it is the hottest one (the angles being counted from the inlet side of the combustion gases=0°). The lower diagram shows the pressure p exerted in the stopper area against the angle, i.e., along the combustion chamber opening. The upper diagram shows the stopper height protrusion h against the angle, i.e., along the combustion chamber opening.

Curve A shows the compression pressure in the case of a stopper with constant height without ignition pressure which corresponds to a cold engine. Curve B shows the situation with ignition pressure, i.e. in the case of a warm engine as it is in use. From curves A and B it may be seen that in the case of the warm engine the pressure is reduced so that in certain areas, especially in the outlet area, the stopper will be without contact to other parts of the gasket or the cylinder block. However, it is desirable to ensure such a contact around the combustion chamber opening, but to avoid at the same time a deformation of the cylinder head especially when it is out of an aluminium alloy. A deformation takes place when a pressure limit as shown by line C is exceeded.

The curves A and B are calculated by the method of finite elements. Then the stopper protrusion h is varied, i.e. the stopper is provided with a height profile, and curves A and B are recalculated. In interative steps this is repeated until the desired result according to curves D and E (corresponding to A and B, respectively) is reached, i.e. so that the increase in the compression pressure p as a result of thermal expansions to be expected because of the operating temperature of the internal combustion engine is additionally taken into account by providing the height profile with an additional height of about 10 to 60 μm so that the profiling is designed substantially in accordance with a mid-range between an increase in compression pressure resulting from thermal expansions and a decrease in compression pressure resulting from component stiffnesses.

As may be seen from curves D and E, a deformation of the cylinder head is avoided and a permanent contact of the stopper with an adjacent part of the gasket or the engine is secured.

After having calculated the height profile of the stopper, the latter is provided having a predetermined height and then its height is reduced according to the calculation by embossing as shown in the upper diagram of FIG. 14.

The stopper height protrusion h, i.e. in the case of the stopper shown in FIG. 14 the height of the ring 21, may have a constant thickness between about 50 μm and 200 μm and is then provided with a height profile on the side opposite to the carrier plate 7 after which the ring 21 is welded to the carrier plate 7.

The invention can also be applied to cylinder head gaskets which have only one combustion chamber opening.

While the invention has been shown and described with reference to preferred embodiments, it should be apparanet to one ordinary skilled in the art that many changes and modifications may be made without departing from the spirit and scope of the invention as defined in the claims.

What is claimed is:

1. In a metallic cylinder head gasket for an internal combustion engine having a cylinder block with adjacent combustion chambers separated by respective webs and a cylinder head connected to said block by bolts, having at least one sheet metal layer of resilient metal, which is provided with combustion chamber openings separated by respective gasket webs corresponding to the combustion chambers and webs of the internal combustion engine, and also fluid and bolt passage openings, where, around each combustion chamber opening, at a distance from the latter, leaving a plane sheet metal section in an edge area of the opening, a bead is provided, whose spring stroke is limited by a stopper having a height and width extending concentrically with respect to the bead, the improvement comprising that:
    said stopper has a varying height around said combustion chamber opening, dependent on both (a) variations in component stiffness of the gasket when bolted to the cylinder head and (b) variations in component thermal expansion at the operating temperature of the engine; and
    the height of the stopper at the center of the gasket web on a line connecting the centers of adjacent combustion chamber openings has a first, additive height contribution for compensation of component stiffness at the center of the web and a second, subtractive height contribution in the range of about 10 to 60 μm relative to said additive height contribution for compensation of thermal expansion at the center of the web.

2. The cylinder head gasket of claim 1, wherein the height is embossed.

3. The cylinder head gasket of claim 1, wherein the height of the stopper in said gasket web is reduced with respect to the height adjacent said bolt passage openings.

4. The cylinder head gasket of claim 1, wherein a stopper with a varying height dependent on both variations in component stiffness and variations in component thermal expansion is arranged on both inner and outer sides of the respective bead.

5. The cylinder head gasket of claim 4, wherein the inner stopper is higher than the outer stopper.

6. The cylinder head gasket of claim 4, wherein the inner stopper is as high as the outer stopper.

7. The cylinder head gasket of claim 4, wherein the inner stopper is lower than the outer stopper.

8. The cylinder head gasket of claim 1, wherein only one stopper is provided for each of the beads.

9. The cylinder head gasket of claim 1, wherein the stopper is an upset on a ring supported by a carrier plate.

10. The cylinder head gasket of claim 1, wherein the stopper is a ring or ring section attached to a carrier plate.

11. The cylinder head gasket of claim 1, wherein the at least one sheet metal layer comprise two top plates, each having a bead around a combustion chamber opening, which top plates are arranged with mirror symmetry to one another with opposed beads facing each other and between which top plates respective stoppers are located on inner and outer sides of the beads.

12. The cylinder head gasket of claim 1, wherein each stopper is on a carrier plate that is separate from the sheet metal on which the bead is provided.

13. The cylinder head gasket of claim 1, wherein the stoppers are provided on a carrier plate.

14. The cylinder head gasket of claim 1, wherein the stopper is additionally varied in width dependent on both variations in component stiffness and variations in component thermal expansion in accordance with a mid-range between an increase in compression pressure resulting from thermal expansions and a decrease in compression pressure resulting from component stiffness.

15. The cylinder head gasket of claim 1 for an internal combustion engine having cylinder liners and said at least one sheet metal layer including at least one top plate made of resilient metal and a carrier plate, the at least one top plate defining said sheet metal section and having said bead, whose spring travel is limited by said stopper constituting an outer stopper extending concentrically with respect to the bead on its outer side with respect to each combustion chamber opening and carried by the carrier plate,
    wherein the beads are arranged at a distance from the combustion chamber edge, so that they are supported on the cylinder block adjacent to the cylinder liners;
    wherein, on the inner side of the respective bead, an inner stopper is provided which is carried by the carrier plate; and
    wherein the inner stopper has a varying height around said combustion chamber opening, dependent on both (a) variations in component stiffness of the gasket when bolted to the cylinder head and (b) variations in component thermal expansion at the operating temperature of the engine, and the height of the inner stopper at the center of the gasket web on a line connecting the centers of adjacent combustion chamber openings has a first, additive height contribution for compensation of component stiffness at the center of the web and a second, subtractive height contribution in the range of about 10 to 60 μm relative to said additive height contribution for compensation of thermal expansion at the center of the web.

16. The cylinder head gasket of claim 15, wherein each varying height profile is embossed.

17. The cylinder head gasket of claim 15, wherein the varying height in said gasket web is reduced with respect to the height adjacent said bolt passage openings.

* * * * *